United States Patent [19]

Fradenburgh et al.

[11] Patent Number: 5,299,912
[45] Date of Patent: Apr. 5, 1994

[54] DRIVE SYSTEM FOR CHANGING THE DIAMETER OF A VARIABLE DIAMETER ROTOR

[75] Inventors: Evan A. Fradenburgh, Fairfield; Gordon G. Miller, Shelton, both of Conn.

[73] Assignee: United Technologies Corporation, Hartford, Conn.

[21] Appl. No.: 920,861

[22] Filed: Jul. 28, 1992

[51] Int. Cl.⁵ .............................. B64C 27/54
[52] U.S. Cl. ............................ 416/87; 416/89
[58] Field of Search ................ 416/87, 88, 89

[56] References Cited

U.S. PATENT DOCUMENTS

| | | | |
|---|---|---|---|
| 2,163,482 | 6/1939 | Cameron | 416/88 |
| 2,171,333 | 9/1939 | Theodorsen et al. | 416/88 |
| 2,403,899 | 7/1946 | Ammen | 416/87 |
| 2,457,576 | 12/1948 | Littrell | 416/89 |
| 2,749,059 | 6/1956 | Meyers et al. | 416/88 |
| 2,852,207 | 9/1958 | Jovanovich | 416/88 |
| 3,297,094 | 1/1967 | Kisovec | 416/89 |
| 3,501,248 | 3/1970 | Brocker | 416/89 |
| 3,713,751 | 1/1973 | Fradenburgh et al. | |
| 3,768,923 | 10/1973 | Fradenburgh | |
| 3,884,594 | 5/1975 | Fradenburgh | |
| 4,007,997 | 2/1977 | Yarm | |
| 4,074,952 | 2/1978 | Fradenburgh et al. | |
| 4,080,097 | 3/1978 | Hager et al. | |
| 4,142,697 | 3/1979 | Fradenburgh | |
| 4,248,572 | 2/1981 | Fradenburgh | |
| 4,655,685 | 4/1987 | Fradenburgh | |

OTHER PUBLICATIONS

PCT/US90/04288, Int. Filing date. Jul. 31, 1990.

Primary Examiner—Edward K. Look
Assistant Examiner—James A. Larson
Attorney, Agent, or Firm—McAulay Fisher Nissen Goldberg & Kiel

[57] ABSTRACT

A drive system for varying the diameter of a variable diameter rotor has a gear drive system associated with a single coaxial shaft lower end which includes a gear set for increasing or decreasing the speed of rotation of the coaxial shaft relative to the rotor drive shaft to change the length of two or more variable length blades. Utilizing a single shaft system allows a variable diameter rotor drive system to be adapted to gimballed rotors which require shaft flexibility. Since only a single shaft extends through the rotor drive shaft, hub complexity is reduced.

13 Claims, 5 Drawing Sheets

DRIVE SYSTEM FOR CHANGING THE DIAMETER OF A VARIABLE DIAMETER ROTOR

TECHNICAL FIELD

This invention relates to variable diameter rotors for aircraft and more particularly to a simplified drive system for effecting retraction and extension of variable diameter rotor blades.

BACKGROUND

A tiltrotor aircraft is one which typically has a pair of pods located on its wings for supporting a pair of rotors, the pods being movable between a vertical position when the rotors serve as helicopter rotors for vertical take-offs and landings, and a horizontal position when the rotors serve as propellers for forward flight.

Generally, a large rotor diameter is advantageous for operating the aircraft in the helicopter mode to provide low disk loading which results in efficient operation, low noise levels and diminished downwash velocities.

On the other hand, a relatively small diameter is advantageous in the propeller mode to reduce tip speed and blade area for improved propulsion efficiency, minimized blade aero-elastic properties and to simplify ground handling.

Various mechanisms are known for providing the means for extending and retracting variable diameter rotor blades. For example, in U.S. Pat. No. 3,768,923, a jackscrew and nut arrangement is used to produce telescopic motion between inner and outer blade portions. Referring to FIG. 1, two coaxial shafts A and B are connected to upper and lower bevel gears C and D to form part of a differential unit which includes pinion gears E connected to the jackscrew shafts F in each blade. The coaxial shafts rotate with the rotor drive shaft G during constant diameter operation. However, each shaft has a brake H and I, respectively such that when the brake is applied, the selected shaft and rotor rotate at different speeds. Depending on which shaft undergoes braking, this speed differential drives the respective bevel gear and jackscrews for rotation, with rotation in opposite directions depending on which brake is applied to which coaxial shaft. Thus, application of a brake to one or the other shafts will drive the jackscrew to either extend or retract the rotor blade.

While such an assembly is acceptable in some circumstances, such as with articulated or hingeless rotor hubs, it is difficult to incorporate into a gimballed rotor hub which must tilt relative to the rotor drive shaft, so that both internal coaxial shafts would also be required to have a degree of flexibility or articulation. This is difficult to provide in a limited space, and adds weight and maintenance penalties.

SUMMARY OF THE INVENTION

It is an object of the present invention to provide a drive system for a variable diameter rotor which is simple in design yet adaptable to gimballed rotor hubs.

It is a further object to provide a drive system for a variable diameter rotor which utilizes a single shaft extending through the rotor drive shaft.

It is a further object to provide a variable diameter rotor drive system which is lightweight.

These and other objects of the present invention are achieved by providing a drive system for a variable diameter rotor having two or more variable length blades supported by a hub, the drive system comprising a coaxial shaft disposed within a rotor drive shaft, the rotor drive shaft connected to the hub for corotation therewith, means in the hub for effecting retraction or extension of a rotor blade, and, means for selectively varying the speed of the coaxial shaft relative to the rotor drive shaft such that the coaxial shaft rotates at either a higher or lower speed relative to the rotor drive shaft. Such means may comprise brake means associated with the coaxial shaft to slow or stop the shaft and a gear set engaged with the shaft such that activating the gear set increases the rotational speed of the coaxial shaft relative to the rotor drive shaft.

In one embodiment of the invention, rotor drive shaft rotation is used to cause the coaxial shaft to rotate at a higher rotational speed which may be used for either retraction or extension of the rotor blades. Preferably the gear set and brake are located in association with the lower portion of the rotor drive shaft. Utilizing a single coaxial shaft, drive system complexity and weight are reduced, simplifying the hub for accommodation of a gimballed rotor head. Thus, a low weight efficient drive system is provided.

BRIEF DESCRIPTIONS OF THE DRAWINGS

DETAILED DESCRIPTION OF THE INVENTION

Figure 1:
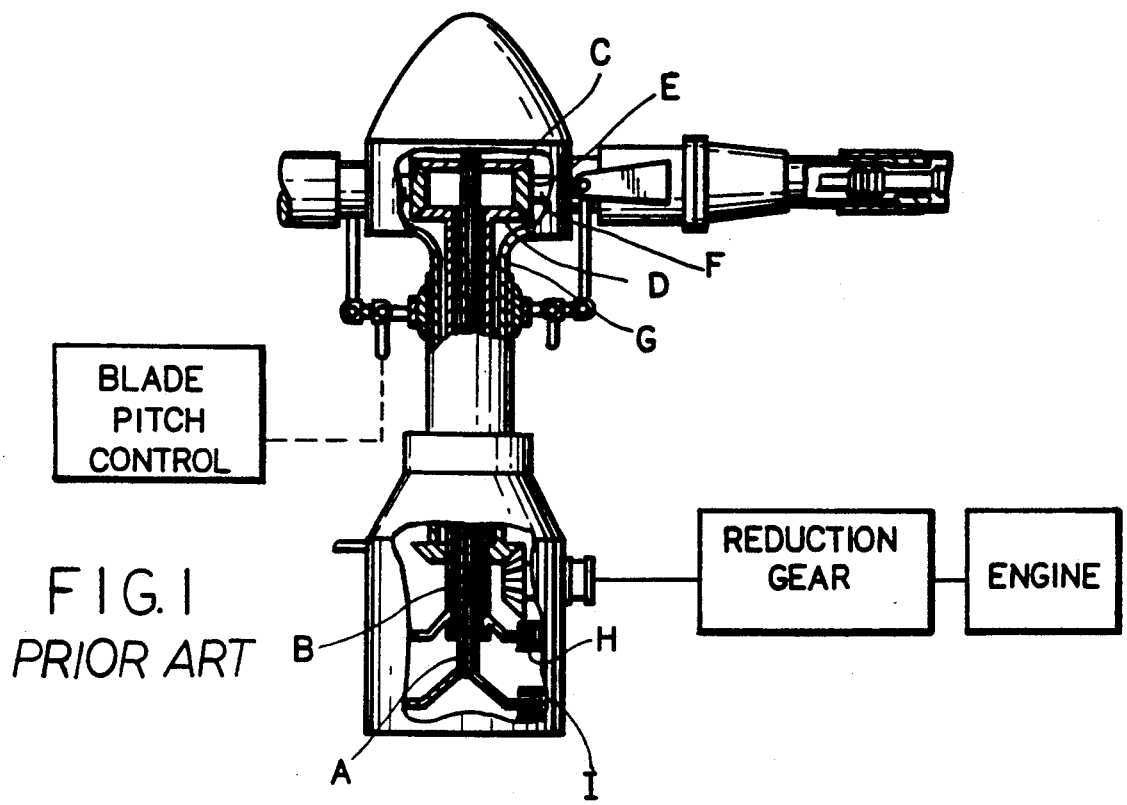
FIG. 1 is a prior art double coaxial shaft drive system.
Figure 2:
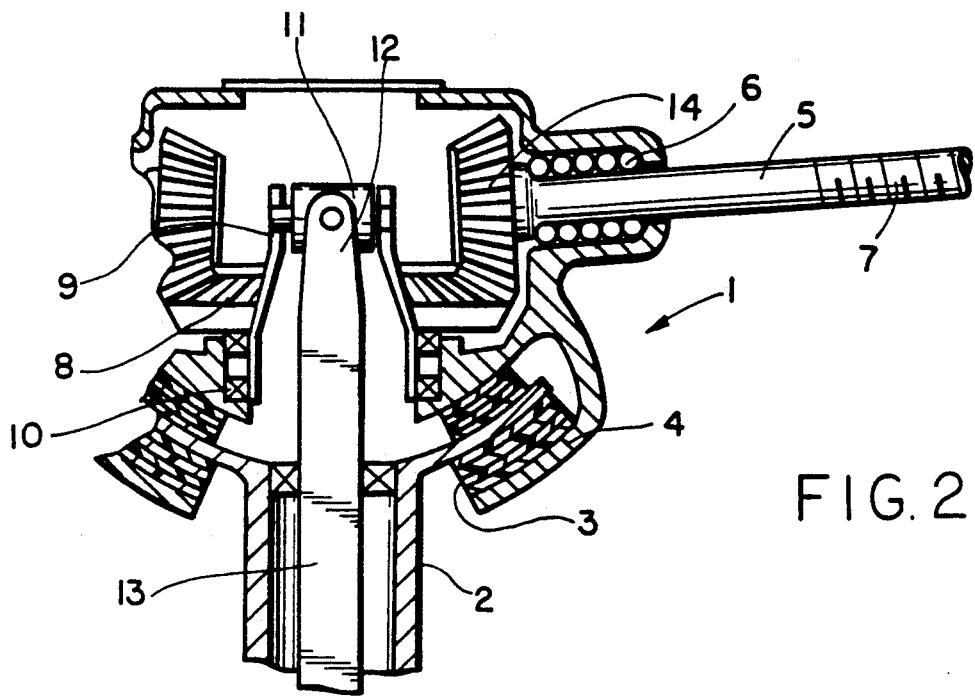
FIG. 2 is a cross-sectional view of one embodiment of the hub usable with the drive system of the invention.

Referring to FIG. 2, a gimballed hub system 1 for a variable diameter rotor is shown. The hub system has a rotor drive shaft 2 which communicates through gimballed bearings 3 to a hub 4. Two or more jackscrews 5 extend from the hub 4 with the jackscrews supported by bearings 6 in the hub. Each jackscrew has a threaded portion 7 which engages a nut or other portion of a movable blade section, not shown. Typically, the jackscrew and blade section are threadably engaged such that rotation of the jackscrew will cause translation of a movable blade section which will increase or decrease the blade length. Of course, as the individual blade length increases or decreases, the rotor diameter varies. Such a system is described in U.S. Pat. No. 3,884,594.

A bevel gear 8 is attached to a stub shaft 9 which is supported at one end by bearings 10 in the hub, and at the other end is attached to a universal joint il mounted on a yoke 12 of a coaxial shaft 13. The bevel gear 8 is engaged to bevel pinion 14 attached to the jackscrews 5. Corotation of the shafts 2 and 13 at the same speed results in no movement between the bevel gear 8 and bevel pinions 14. When the shaft 13 moves slower than the drive shaft 2, the stub shaft 9 slows and the bevel gear 8 inside the hub slows and the pinion 14 is then caused to roll around the bevel gear, turning the jackscrew 5 to adjust blade length. When the coaxial shaft 13 moves faster than the drive shaft 2, this drives the bevel gear 8 in the hub to cause the bevel pinions to turn in the opposite direction turning the jackscrews 5 in the opposite direction. The choice of jackscrew thread, right hand or left hand, determines which direction of rotation extends or retracts the blades. For illustrative purposes, the gear drive system will be described such that the slower speed will retract the blade and the faster speed will extend the blade. It will be understood that the opposite configuration could easily be accommodated with the present invention. However, the higher torque requirements associated with blade retraction are more easily accommodated by slowing the shaft for retraction.

Figure 3:
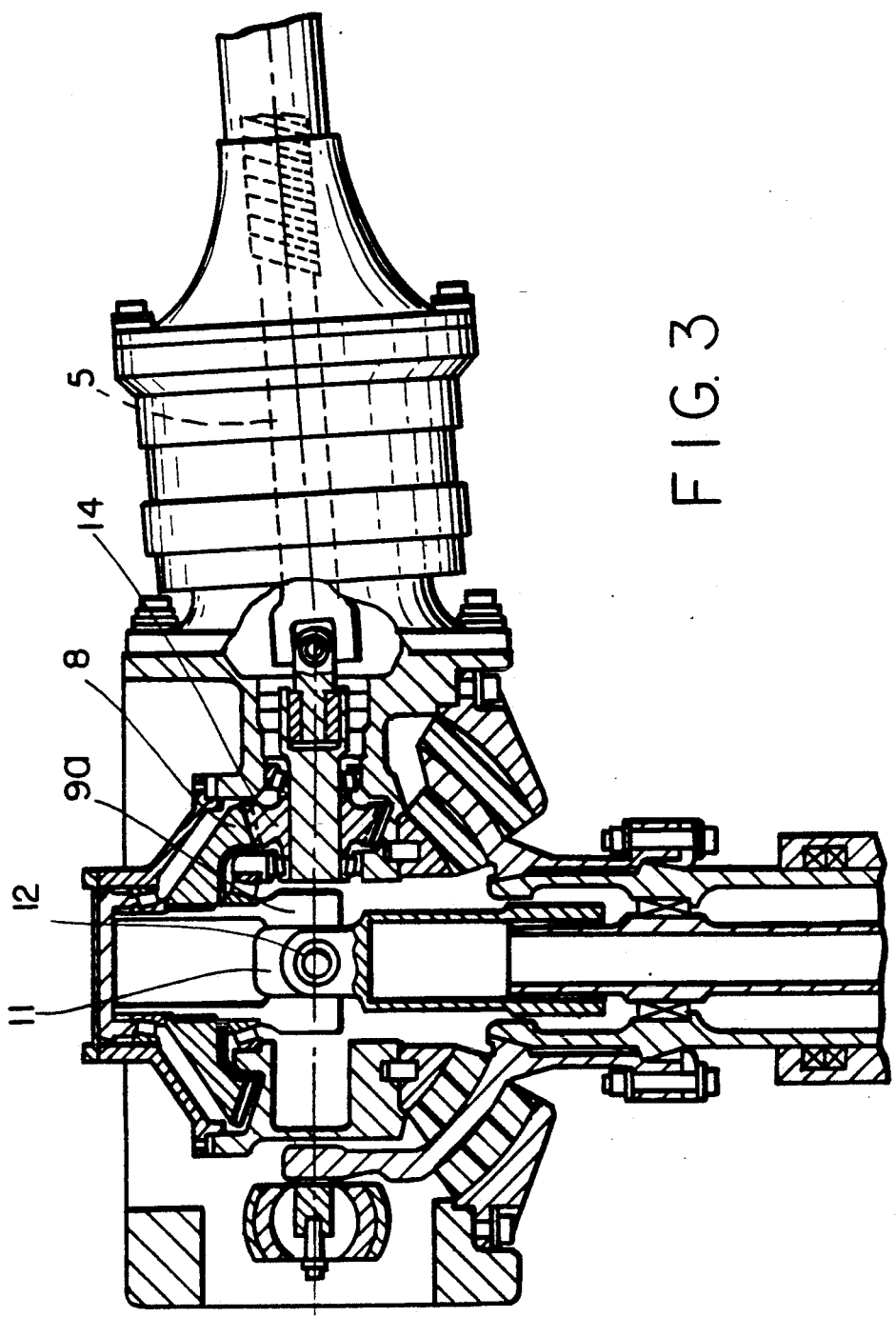
FIG. 3 is a cross-sectional view of an alternative embodiment of the hub of FIG. 2.

FIG. 3 shows an alternative embodiment of the hub, with the stub shaft 9a in an upper rather than lower orientation which allows for compactness of the hub components.

Figure 4:
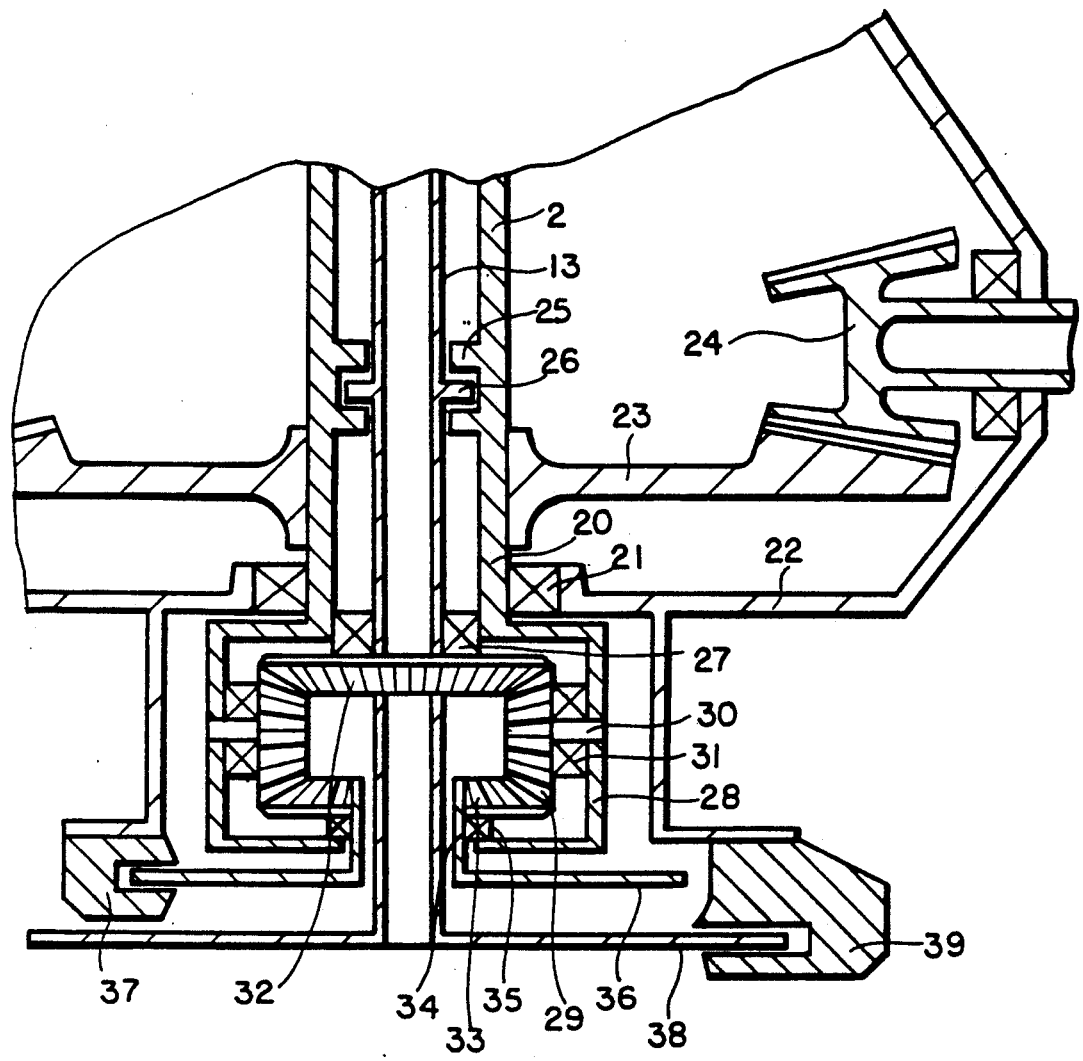
FIG. 4 is a cross-sectional view of an embodiment of the drive system of the invention.

Preferably, a gear drive system is provided in association with a lower end of the shaft 13 for driving the shaft. Referring to FIG. 4, the drive shaft 2 has a lower end 20 supported for rotation by bearing 21 within a transmission housing 22. The drive shaft has a drive gear 23 engaged to an interconnecting shaft 24 for synchronizing two rotors of a tiltrotor aircraft. If the driving engine or engines are inboard of the rotor pod, then shaft 24 transmits engine power to the rotor system. Alternately, the drive engines may be located in the tiltable pods, in which case engine power is transmitted to the rotors by other conventional geared connections, not shown. A locking clutch or brake 25 may be used to lock the shaft 13 and the drive shaft 2 for corotation during constant rotor diameter operation.

The brake 25 acts on an outwardly extending disk 26 to lock the two shafts together in conventional fashion. Such disk brakes are well known in the field. The brake action is typically initiated on pilot command possibly using a solenoid control switch. Preferably, brake release will be simultaneous with actuation of the blade extension or retraction system. Alternative locking schemes, similar to those shown in U.S. Pat. Nos. 4,074,952 and 4,080,097, may be used.

A bearing 27 rotatably supports the shaft 13 to allow a variation in rotational speed to occur between the two shafts. The drive shaft 2 has a lower end which forms a differential housing 28. Within the housing are located one or more bevel pinions 29 supported by pins 30 and bearings 31. An upper bevel gear 32 which is fixed to the shaft 13 is engaged with the bevel pinions. A lower bevel gear 33 is also engaged with the bevel pinions. The lower bevel gear is fixed to a stub shaft 34, supported rotatably relative to the housing 28 by bearings 35. The stub shaft has a disk 36 which is engagable by brake 37. The shaft 13 also has a lower disk 38 engagable by a brake 39. Both brakes 37 and 39 are supported on the transmission housing 22.

For purposes of illustration, the brake 37 is an extension brake, causing extension of the blades when actuated, and the brake 39 is a retraction brake, causing retraction of the blades when actuated. However, depending on the choice of hub gear arrangement and jackscrew design, this operational convention could be reversed.

In operation, the brake 25 is engaged to maintain a desired constant rotor diameter. Should extension be desired, the brake 25 is disengaged and the blade extension brake 37 applied. This slows or stops the stub shaft 34 and the bevel gear 33. The pinions 29, supported off the lower end of drive shaft 2, continue to rotate about the axis of drive shaft 2, but because the bevel gear 33 has been slowed or stopped, the pinions 29 are also forced to rotated about the centerline of pins 30 and bearings 31, in turn driving the upper bevel gear 32 and shaft 13 at a speed higher than the rotor drive shaft speed. The increased shaft speed drives the bevel gear and pinions in the rotor head to rotate relative to the rotor hub, rotating the jackscrews and extending the blades. When the desired extension is achieved, the brake 37 is disengaged and the brake 25 reengaged.

To retract the blades, the brake 25 is disengaged but the retraction brake 39 is applied which slows the shaft 13 relative to the rotor drive shaft. This causes the bevel gear pinions in the hub to drive the jackscrew in the opposite direction to reduce the rotor diameter. When the retraction is complete, the brake 39 is disengaged and the brake 25 reengaged.

The brakes and clutches are operated in conventional fashion, for example, through a pilot controlled solenoid mechanism.

Figure 5:
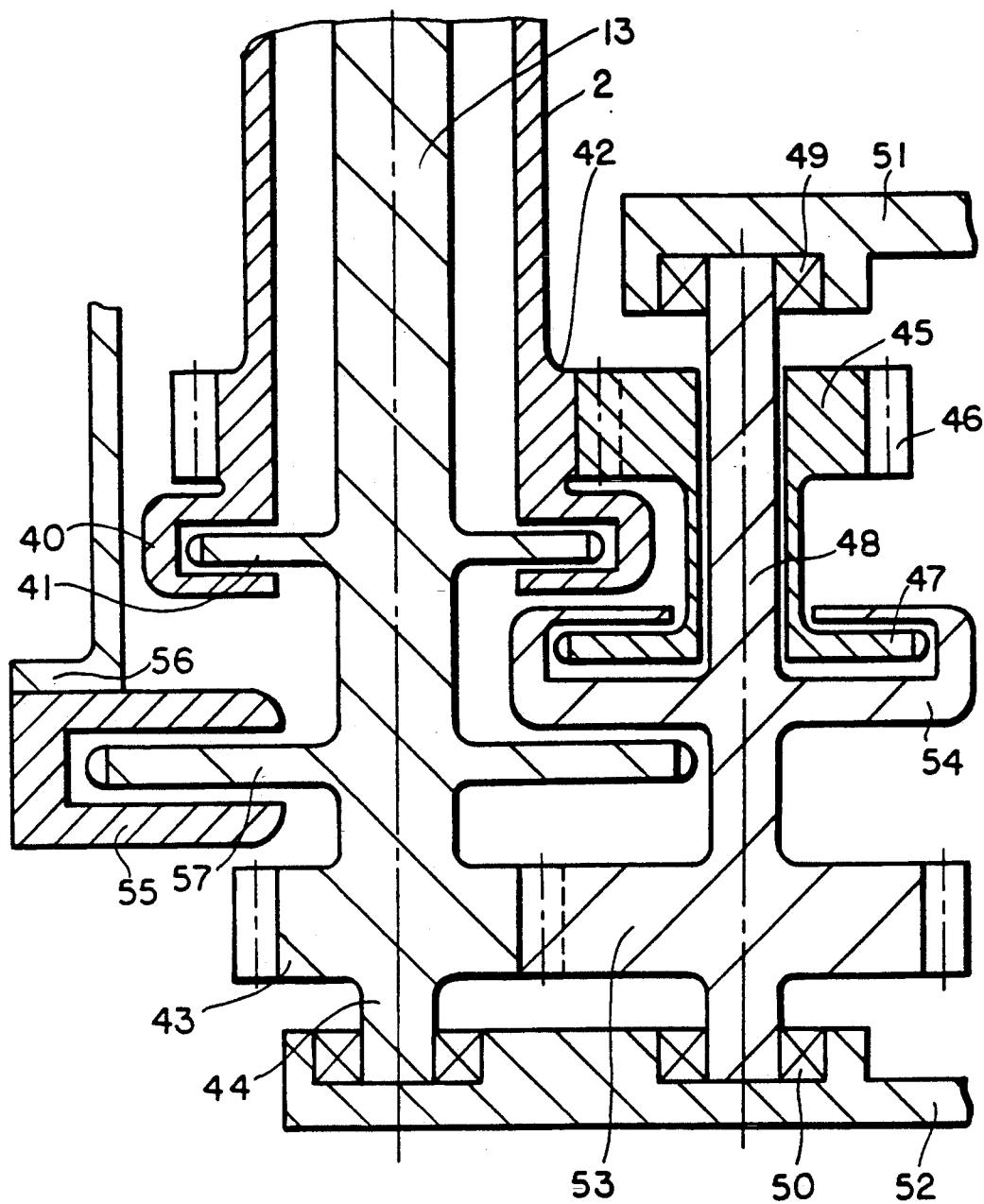
FIG. 5 is a cross-sectional view of an alternative embodiment of the drive system of the invention.

Alternatively, the gear drive system may utilize a parallel shaft, rather than a coaxial stub shaft. Referring to FIG. 5, an alternative embodiment of the invention is shown. The shaft 2 has a locking brake 40 and disk 41 as before for locking the shafts 2 and 13 together for corotation during constant rotor diameter operation. The rotor drive shaft 2 has a first spur gear 42 fixed at a mid-portion thereof and a the coaxial shaft 13 has second spur gear 43 fixed at an end 44 thereof. The location of the corotation brake is considered a matter of design choice. The first spur gear 42 engages a sleeve shaft 45 through a mating spur gear 46. The shaft 45 has a disk 47 at a lower end thereof. The sleeve shaft is fitted over a mating shaft 48 which is rotatably supported by bearings 49 and 50. The bearings are seated on transmission housing portions 51 and 52. The mating shaft 48 has a lower spur gear 53 engaged with the second spur gear 43 on the coaxial shaft 13. The mating shaft also includes a brake 54 for operation with the disk 47 of the sleeve shaft 45. A brake 55 supported on transmission housing portion 56 is disposed adjacent a disk 57 extending from the shaft 13.

In operation, the brake 40 is engaged during constant diameter operation, with the brakes 54 and 55 disengaged. At this time, the mating shaft 48 rotates freely, as does the sleeve shaft 45.

To effect a retraction, as before, the brake 40 is disengaged and the brake 55 applied, slowing or stopping the shaft 13 relative to the rotor drive shaft 2 to effect rotation of the gears in the rotor hub and to drive the blade jackscrews as described previously. When the desired retraction is complete, the brake 55 is disengaged and the brake 40 reengaged.

To effect an extension, the brake 40 is disengaged and the brake 54 is applied. This locks the mating shaft 48 to the sleeve shaft 45, thus driving the mating shaft 48 through gears 42 and 46 using rotor power. The gears 42, 46, 43 and 53 are chosen to yield a gear ratio which drives the shaft 13 at a speed higher than the rotor drive speed, to effect rotation of the gears in the rotor hub and the blade jackscrews in the direction to extend the blades. When the desired extension is complete, the brake 54 is disengaged and the brake 40 reengaged.

With either embodiment, a single coaxial shaft is utilized for communicating with the gears in the rotor hub, thus simplifying the hub and allowing accommodation of a universal joint for use in gimballed rotors. Also, locating the controls and gearing in association with the lower portion of the rotor drive shaft, in the transmission housing, simplifies maintenance and accessibility to the drive system components. Lubrication is also simplified.

Figure 6:
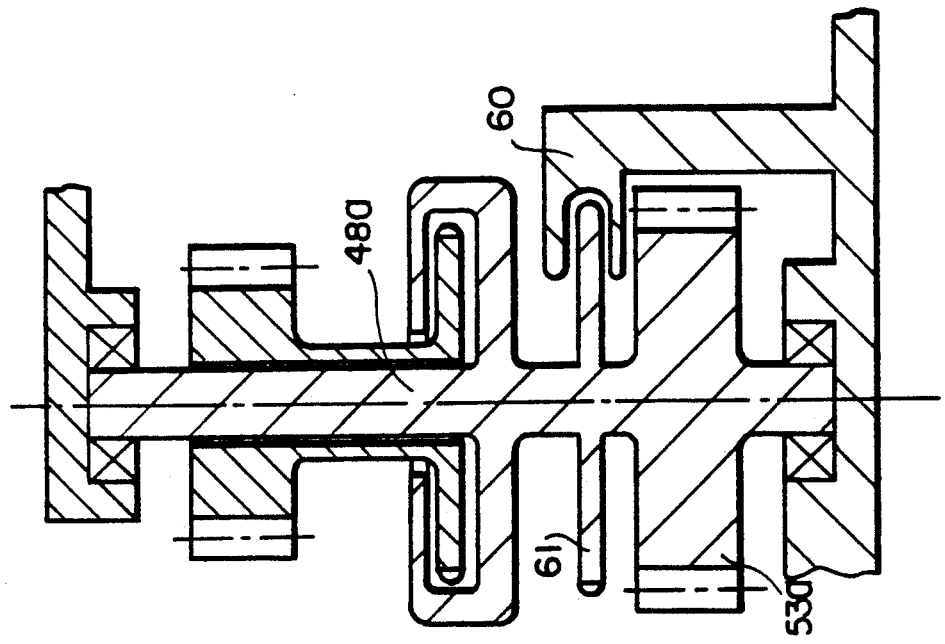
FIG. 6 is another alternative embodiment of the invention.

In another embodiment of the invention, shown in FIG. 6, a retraction brake 60 is associated with a disk 61 on the mating shaft 48a rather than on the shaft 13. Thus, applying the brake 60 slows the mating shaft which acts through the gear 53a to slow the shaft 13. This simplifies construction of the shaft 13 and unifies construction of the drive system.

Figure 7:
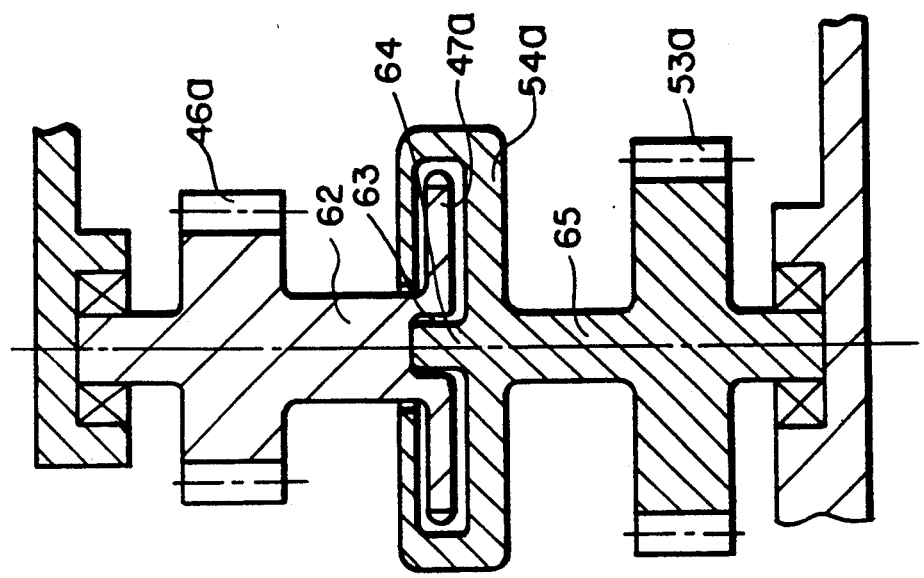
FIG. 7 is another alternative embodiment of the invention.

In yet another embodiment of the invention, shown in FIG. 7, an upper shaft section 62 is substituted for the sleeve shaft 45. The upper shaft section has a bore 63 sized to accept an end 64 of a lower shaft section 65 therein. The lower shaft end 64 is freely rotatable within the bore. The upper shaft section 62 has a spur gear 46a and a disk 47a. The lower shaft has a brake 54a and a spur gear 53a. Thus, this embodiment operates in accordance with the embodiment of FIG. 5.

The choice of gear set ratios may be chosen to accommodate various rates of retraction or extension. For example, in a rotor system having a normal drive shaft speed of 250 rpm a pair of spur gears, representing gears 42 and 46, may be chosen to have a 7:5 ratio to yield a parallel shaft speed of 350 RPM. A gear set ratio of 5:7, representing gears 43 and 53, would then yield a shaft speed of 490 RPM or +240 RPM relative to the drive shaft speed. Of course, any reasonable speed can be attained.

Using the drive system of the invention, variable diameter rotors are adaptable to gimballed rotors, increasing their utilization. However, any variable diameter rotor can benefit by the simplified internal shafting of the invention and the invention is not limited to use in gimballed rotors.

While preferred embodiments of the present invention have been shown and described, it will be understood by those skilled in the art that various changes or modifications could be made without varying from the scope of the present invention.

We claim:

1. A gear drive system for a variable diameter rotor having a hub, one or more variable length blades extending from the hub, the hub incorporating means for extending and retracting the one or more blades, a rotor drive shaft attached to the hub for rotating the hub and the one or more blades, the drive system comprising:
   a single central shaft, extending coaxially within the rotor drive shaft and connected to the hub for extending and retracting the one or more blades;
   first brake means engagable with the central shaft for varying the speed of rotation of the central shaft relative to the rotor drive shaft;
   gear means engaged with the central shaft for varying the speed of rotation of the central shaft relative to the rotor drive shaft, the gear means located at a lower end of the central shaft, the gear means having a stub shaft coaxial with the central shaft, bevel gear means fixed to the stub shaft, pinion gear means engaged to the bevel gear means, the central shaft having a bevel gear engaged to the pinion gear means, second brake means associated with the sub shaft such that applying the second brake means on the stub shaft causes the pinion gear means to rotate the central shaft at a speed different from the rotor drive shaft.

2. The gear drive system of claim 1 wherein the hub incorporating means for extending and retracting the one or more blades has a bevel gear attached to an upper end of the central shaft and one or more pinion gears disposed in the hub and engaged to the one or more blades.

3. The gear drive system of claim 1 wherein the first brake means associated with the central shaft operate such that engaging the first brake means causes the central shaft to rotate at a speed lower than the rotor drive shaft.

4. The gear drive system of claim 1 further comprising third brake means disposed between the rotor drive shaft and the central shaft such that engaging the third brake means causes the central shaft to rotate at the same speed as the rotor drive shaft.

5. A gear drive system for a variable diameter rotor having a hub, one or more variable length blades extending from the hub, the hub incorporating means for extending and retracting the one or more blades, a rotor drive shaft attached to the hub for rotating the hub and the one or more blades, the drive system comprising:
   a single central shaft, extending coaxially within the rotor drive shaft and connected to the hub for extending and retracting the one or more blades;
   first brake means engagable with the central shaft for varying the speed of rotation of the central shaft relative to the rotor drive shaft;
   gear means engaged with the central shaft for varying the speed of rotation of the central shaft relative to the rotor drive shaft, the gear means located at a lower end of the central shaft, the gear means having a sleeve shaft having an upper gear engaged to the rotor drive shaft, a mating shaft having a lower gear engaged to the central shaft, and, second brake means disposed therebetween, such that when the second brake means is engaged, the sleeve and mating shafts lock together causing the central shaft to rotate at a speed different from the rotor drive shaft.

6. The gear drive system of claim 5 wherein the hub incorporating means for extending and retracting the one or more blades has a bevel gear attached to an upper end of the central shaft and one or more pinion gears disposed in the hub and engaged to the one or more blades.

7. The gear drive system of claim 5 wherein the first brake means are engagable with the central shaft through the mating shaft, such that engaging the first brake means slows the mating shaft, causing the central shaft to rotate at a speed different from the rotor drive shaft.

8. The gear drive system of claim 5 wherein the first brake associated with the central shaft operate such that engaging the first brake means causes the central shaft to rotate at a speed lower than the rotor drive shaft.

9. The gear drive system of claim 5 further comprising third brake means disposed between the rotor drive shaft and the central shaft such that engaging the third brake means causes the central shaft to rotate at the same speed as the rotor drive shaft.

10. A gear drive system for a variable diameter rotor having a hub, one or more variable length blades extending from the hub, the hub incorporating means for extending and retracting the one or more blades, a rotor drive shaft attached to the hub for rotating the hub and the one or more blades, the drive system comprising:

a single central shaft, extending coaxially within the rotor drive shaft and connected to the hub for extending and retracting the one or more blades;

first brake means engagable with the central shaft for varying the speed of rotation of the central shaft relative to the rotor drive shaft;

gear means engaged with the central shaft for varying the speed of rotation of the central shaft relative to the rotor drive shaft, the gear means located at a lower end of the central shaft, the gear means having an upper shaft having an upper gear engaged to the rotor drive shaft, a lower shaft coaxial with the upper shaft and having a lower gear engaged to the central shaft and second brake means disposed therebetween such that when the second brake means is engaged, the upper and lower shafts lock causing the central shaft to rotate at a speed different from the rotor drive shaft.

11. The gear drive system of claim 10 wherein the hub incorporating means for extending and retracting the one or more blades has a bevel gear attached to an upper end of the central shaft and one or more pinion gears disposed in the hub and engaged to the one or more blades.

12. The gear drive system of claim 10 wherein the first brake means associated with the central shaft operate such that engaging the first brake means causes the central shaft to rotate at a speed lower than the rotor drive shaft.

13. The gear drive system of claim 10 further comprising third brake means disposed between the rotor drive shaft and the central shaft such that engaging the third brake means causes the central shaft to rotate at the same speed as the rotor drive shaft.

* * * * *